United States Patent [19]

Tamura

[11] 4,310,141

[45] Jan. 12, 1982

[54] VACUUM OPERATED VALVE MECHANISM

[76] Inventor: Tooru Tamura, 40, Nakaneyama, Takaoka-honmachi, Tokoya City, Japan

[21] Appl. No.: 25,202

[22] Filed: Mar. 29, 1979

[30] Foreign Application Priority Data

Apr. 7, 1978 [JP] Japan .............................. 53-46242[U]

[51] Int. Cl.³ ........................................ F16K 31/128
[52] U.S. Cl. .................................... 251/28; 123/327;
251/61.3; 251/61.5; 261/DIG. 19
[58] Field of Search ...................... 123/97 B, DIG. 11;
251/28, 61.3, 61.5; 261/DIG. 19

[56] References Cited

U.S. PATENT DOCUMENTS

| | | | |
|---|---|---|---|
| 2,610,819 | 9/1952 | Sutton | 251/28 |
| 2,824,726 | 2/1958 | Dietrich et al. | 123/97 B |
| 2,848,202 | 8/1958 | Leibing | 261/DIG. 19 |
| 2,933,168 | 4/1960 | Leibing et al. | 123/97 B |
| 2,993,485 | 7/1961 | Cornelius | 261/DIG. 19 |
| 3,364,909 | 1/1968 | Mick | 123/97 |
| 3,465,735 | 9/1969 | Francis et al. | 123/117 |
| 3,788,291 | 1/1974 | Wu | 123/97 B |
| 4,108,197 | 8/1978 | Brakebill | 251/61.3 |
| 4,170,971 | 10/1979 | Yamanaka | 123/97 B |

Primary Examiner—Martin P. Schwadron
Assistant Examiner—G. L. Walton

[57] ABSTRACT

A vacuum operated valve mechanism for controlling transmission of fluid to servo means for emission control for an internal combustion engine or reducing emissions from the engine, including a single housing, a first and second diaphragm member, a first and second piston member, a pilot valve member and a working valve member.

8 Claims, 3 Drawing Figures

VACUUM OPERATED VALVE MECHANISM

BACKGROUND OF THE INVENTION

1. Field of the Invention

This invention relates to vacuum operated valve mechanisms, and more particularly to vacuum operated valve mechanisms for controlling transmission of fluid to servo means for emission control means.

2. Description of the Prior Art

Conventionally, various mechanisms have been proposed for reducing emissions from the vehicle engine, and more particularly various valve mechanisms have been proposed for controlling an air-fuel ratio and for reducing HC, NO and the like within the exhaust gas by means of introducing fresh air into the engine intake manifold. In general, highest vacuum will be produced within the intake manifold at the engine decelerating condition of vehicle. Thus, fuel such as gasoline adhered to the inside wall of the intake manifold will be sucked or transmitted to engine cylinders so as to increase the ratio of fuel to air. This results in the so-called after burn and in increasing of impure gas such as HC, NO. In order to reduce or eliminate the above drawbacks, the above valve mechanisms have been proposed to introduce fresh air.

However, it is required that the valve mechanisms are maintained in non-operating conditions when receiving the relative higher vacuum pressure during the engine idling condition. Thus, valve members of the valve mechanisms have been subjected to the strong biasing force of the spring. In prior valve mechanisms, therefore, there are drawbacks in that the valve members cannot operate so as to complete desired stroke or lift to assure momentary introduction of fresh air and a sufficient quantity of fresh air.

SUMMARY OF THE INVENTION

Therefore, it is an object of the present invention to provide an improved vacuum operated valve mechanism which obviates the conventional drawbacks mentioned above.

It is another object of the present invention to provide an improved vacuum operated valve mechanism which has a desirable responsiveness.

It is another object of the present invention to provide an improved operated valve mechanism which is simple in construction.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figure 1:
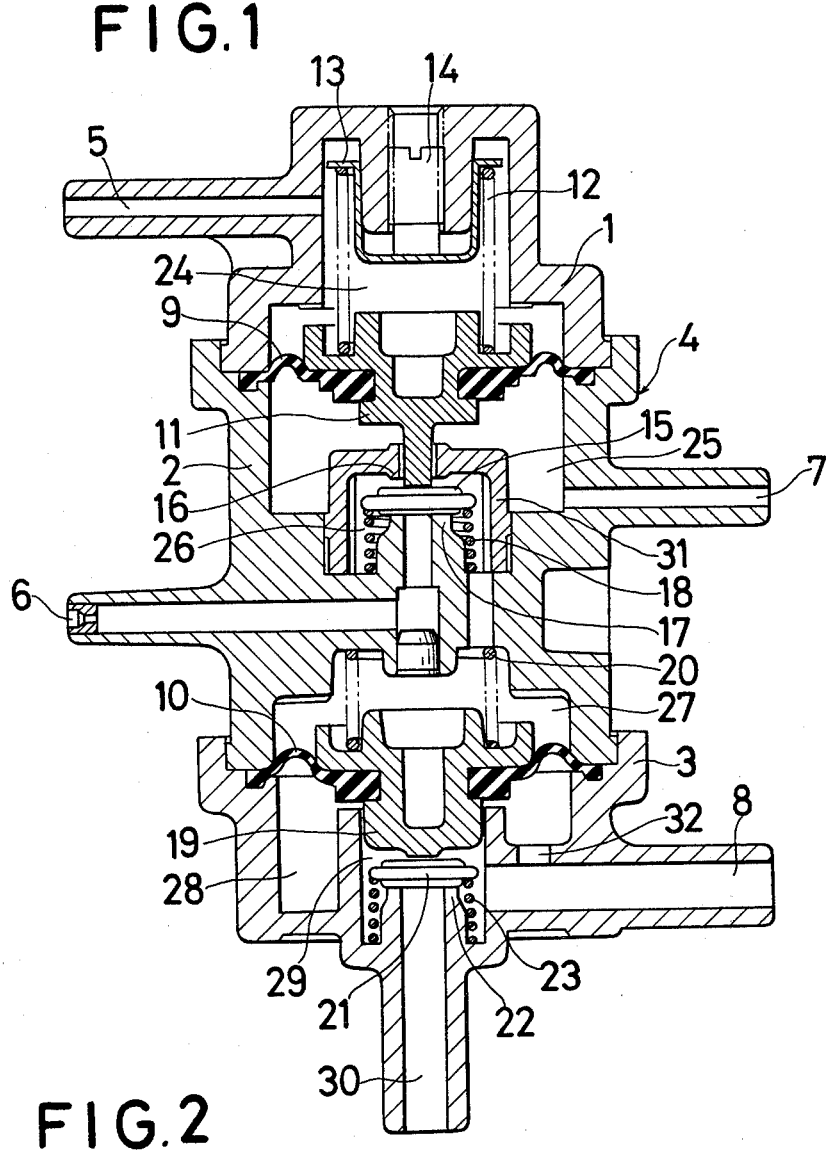
FIG. 1 is a cross-sectional view of the vacuum operated valve mechanism according to the present invention.

Referring now to the drawings and more particularly to FIG. 1, a vacuum operated valve mechanism comprises a single housing 4 having first, second and third sections 1, 2 and 3 secured to one another. The first section 1 has a signal inlet port 5 which receives vacuum from an engine intake manifold, and the second section 2 has an inlet port 6, having an orifice therein, which receives working vacuum from the intake manifold at one side and has an atmospheric port 7 at the other side. The third section 3 has an inlet port 8 for fresh air and an outlet port 30 which is hydraulically connected to the intake manifold.

A first diaphragm member 9 is positioned between the first and second sections while a second diaphragm 10 is positioned between the second and third sections 2 and 3 so as to thereby define chambers 24 and 25, 27 and 28. The first diaphragm member 9 has at its inner periphery a first piston 11 which is downwardly biased by a spring 12. The other end of the spring 12 is seated against a retainer 13, the position of which is displaceable by means of an adjusting bolt 14 to thereby adjust the biasing force of the spring 12. A lower end of the first piston 11 extends through a stationary member 31 secured to the second section 2 and is engageable with a pilot valve member 15. The valve member 15 normally engages with a seat 17 provided on the second section 2 by the lower end of the first piston 11, but is brought into contact with a seat 16 provided on the stationary member 31 by means of a spring 18 when the piston 11 is moved upwardly.

The second diaphragm member 10 has at its inner periphery a second piston 19 which is downwardly biased by a spring 20. Thus, a lower end of the second piston 19 is normally brought in contact with a working valve member 21 so as to cause the latter to be in contact with a seat 22 on the third section 3 against a spring 23. A chamber 26 which houses the above pilot valve member 15 therein is normally connected to the chamber 25 through a gap between the stationary member 31 and the lower end of the first piston 11. Chamber 29 which houses the above working valve member 21 therein is always connected to the chamber 28 through a hole 32 and a gap between the third section 3 and the second piston 19.

In operation, parts of the valve mechanism are positioned in their illustrated positions under non-operating conditions. When vacuum pressure within the chamber 24 from the intake manifold attains a predetermined value, the first diaphragm member 9 is moved upwardly against the spring 12 due to the difference in pressures between chambers 24 and 25. The pilot valve member 15 follows by the biasing force of spring 18 so that the valve member 15 is spaced from the seat 17 and is brought in contact with the seat 16. Thus, the chamber 26 which hitherto received atmospheric pressure now receives vacuum pressure through the port 6.

Vacuum pressure within the chamber 26 is transmitted to the chamber 27 so that the second diaphragm 10 with the piston 19 is upwardly moved against the spring 20. The valve member 21 follows by the spring 23 so as to be disengaged from the seat 22. As a result, fresh air is introduced from the port 8 to the intake manifold through the port 30. Thus, the after-burn which will be apt to occur at the sudden deceleration condition of engine may be prevented and HC, CO and the like within the exhaust gas will be reduced.

It is known that the higher vacuum of about 600 mm Hg will be produced due to the sudden closing movement of the throttle valve at the engine deceleration condition in comparison with about 500 mm Hg at the engine idling condition. In view of the above conditions, it is desired that the valve member 21 be opened by a vacuum of 600 mm Hg in order to avoid the afterburn, but still be closed during the engine idling condition. Furthermore, the introduction of fresh air into the intake manifold is desired to be large in quantity and to occur momentarily (i.e. a very brief time period) in order to prevent the after-burn. Therefore, it is required that the effective diameter of the port 30 is designed to be large and the biasing force of the spring 20 is designed to be small to thereby assure the momentary large stroke of the valve member 21.

According to the present invention, the pilot valve member 15 is initially actuated by the high vacuum pressure of about 560–600 mm Hg transmitted to the chamber 24 against the spring 12, the biasing force of which is set to be strong. The pilot valve member 15 may be lifted slightly since the valve member 15 may act as change-over valve to transmit the vacuum pressure to the chamber 27. Therefore, the pilot valve member 15 completes its function instantaneously in spite of the strong biasing force of the spring 12.

Figure 2:
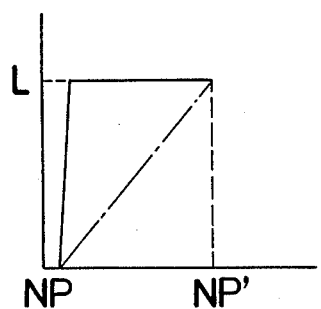
FIG. 2 is a view illustrating characteristics of operation of the valve mechanism according to the present invention in comparison with the conventional mechanism.

Both sides of the diaphragm member 10 are normally subjected to atmospheric pressure so that the weak biasing force of the spring 20 is sufficient to maintain the second diaphragm member 10 and the valve member 21 in their illustrated positions. Thus, the large stroke or lift of the valve member 21 which follows the momentary movement of the diaphragm member 10 is possible when the chamber 27 receives the vacuum pressure. This may be apparently explained according to FIG. 2.

According to the specific construction of the present invention, the desired lift L of the valve member 21 is possible instantaneously after the vacuum pressure attains the predetermined value NP, as shown by the solid line. Assuming that there is no pilot valve member, in order to obtain the desired lift L of the working valve member, there is a time lag where the vacuum pressure increases to NP' and the valve member is gradually lifted therebetween as shown by the chain dotted line in FIG. 2.

Figure 3:
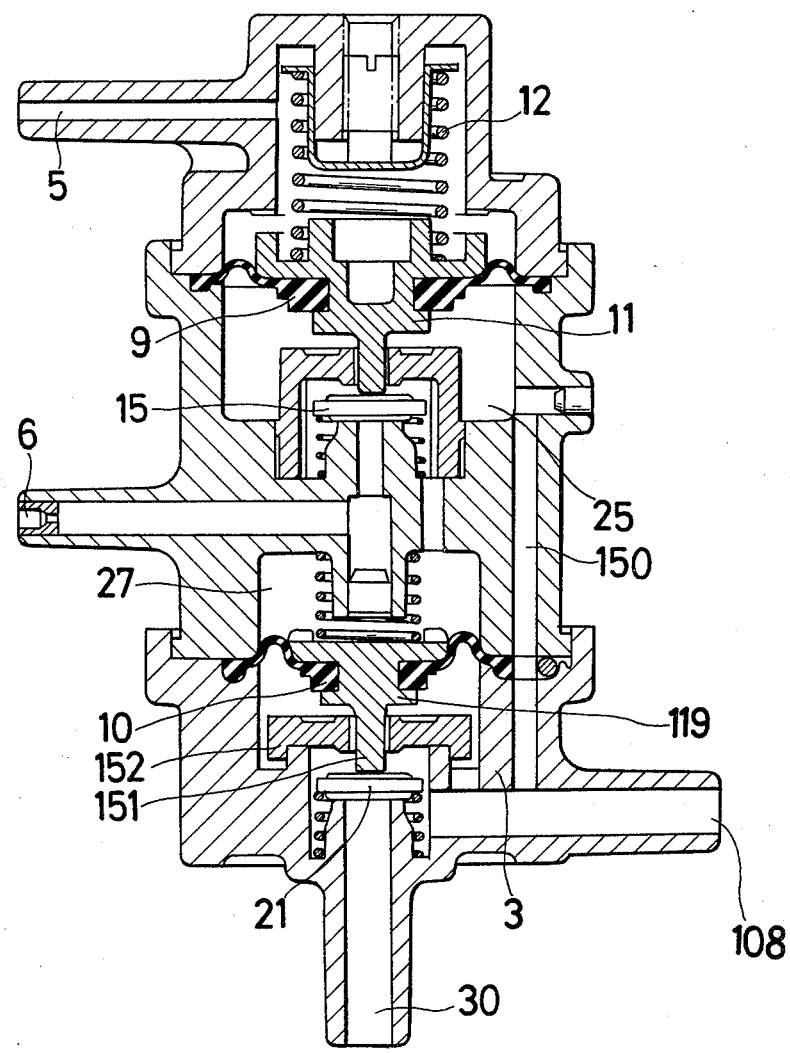
FIG. 3 is a view similar to FIG. 1, but showing a modification of the present invention.

Turning to FIG. 3 showing a modification of the present invention, the same parts as those of the previous embodiment will be designated by the same reference numerals to omit detailed explanation thereof.

An atmospheric port 108 is further connected to the chamber 25 through a passage 150. A second piston 119 has a lower extending end or projection 151 which extends through a stationary member 152 secured to the third section 3 to thereby normally maintain the valve member 21 in its closed position. The operation of this modification will be the same as that of the previous embodiment so that detailed explanation thereof is omitted.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vacuum operated valve mechanism comprising: a single housing having first and second inlet ports which receive vacuum pressure first and second atomspheric inlet means and an outlet port;
a first diaphragm member disposed within said housing;
a first piston member connected to said first diaphragm and arranged within said housing to thereby divide said housing into a first vacuum chamber which is connected to said first inlet port and a first atmospheric chamber connected to said first atmospheric inlet means;
means for biasing said first piston member disposed within said housing into a first position when the pressure differential between said first vacuum chamber and said first atmospheric chamber is less than a first predetermined value;
a pilot valve member mounted within said housing and actuated by engagement with said first piston member when said first piston member is in said first position;
a second diaphragm member disposed within said housing;
a second piston member connected to said second diaphragm and arranged within said housing to thereby divide said housing into a second chamber and a second atmospheric chamber said second atmospheric chamber being connected to said second atmospheric inlet means, said second chamber being in selective communication with said second inlet port through means of said pilot valve member when said pilot valve member is actuated, said second chamber being in selective communication with said first atmospheric chamber when said pilot valve member is not actuated, wherein the air pressure differential between said second chamber and said second atmospheric chamber is zero when said first piston is in said first position;
biasing means biasing said second piston member in said housing to a first position until the pressure differential between said second chamber and said second atmospheric chamber reaches a second predetermined value smaller than said first predetermined value; and
a working valve member mounted in said housing and actuated by engagement with said second piston in a second position to introduce atmospheric pressure into said outlet port.

2. A vacuum operated valve mechanism as set forth in claim 1, further comprising means for biasing said pilot valve member into engagement with said first piston.

3. A vacuum operated valve mechanism as set forth in claim 1, further comprising means for biasing said working valve member into engagement with said second piston.

4. A vacuum operated valve mechanism as set forth in claim 1, further comprising means for biasing said pilot valve member into engagement with said first piston and for biasing said working valve member into engagement with said second piston.

5. A vacuum operated valve mechanism as set forth in claim 1, further comprising a third chamber formed within said housing and within which said pilot valve member is mounted, and which continuously communicates with said second chamber and selectively communicates with said first atmospheric chamber as a result of operation of said pilot valve member.

6. A vacuum operated valve mechanism as set forth in claim 1, wherein said second piston further comprises a projection extending therefrom which engages said working valve member to maintain said working valve member in a closed position in an inoperative condition.

7. A vacuum operated valve mechanism as set forth in claim 6, further comprising a stationary member disposed within said second atmospheric chamber between said second piston and said working valve member and through which said projection extends.

8. A vacuum operated valve mechanism as set forth in claim 1, wherein said first and second atmospheric inlet means comprise a single atmospheric port including first and second passage means communicating said atmospheric port with said first and second atmospheric chambers.

* * * * *

UNITED STATES PATENT AND TRADEMARK OFFICE
CERTIFICATE OF CORRECTION

PATENT NO. : 4,310,141
DATED : Jan. 12, 1982
INVENTOR(S) : Tooru Tamura

It is certified that error appears in the above—identified patent and that said Letters Patent is hereby corrected as shown below:

On the title page, after Item [76] should read:

-- [73] Assignee: Aisin Seiki Co., Limited --.

On the title page, column 2, after "Assistant Examiner" should read: -- Attorney, Agent, or Firm-- Oblon, Fisher, Spivak, McClelland & Maier --.

Signed and Sealed this

Sixth Day of April 1982

[SEAL]

Attest:

GERALD J. MOSSINGHOFF

Attesting Officer     Commissioner of Patents and Trademarks